May 6, 1952 W. G. EPPLER 2,595,650
MODEL AIRPLANE FLIGHT CONTROL
Filed March 10, 1950 2 SHEETS—SHEET 2
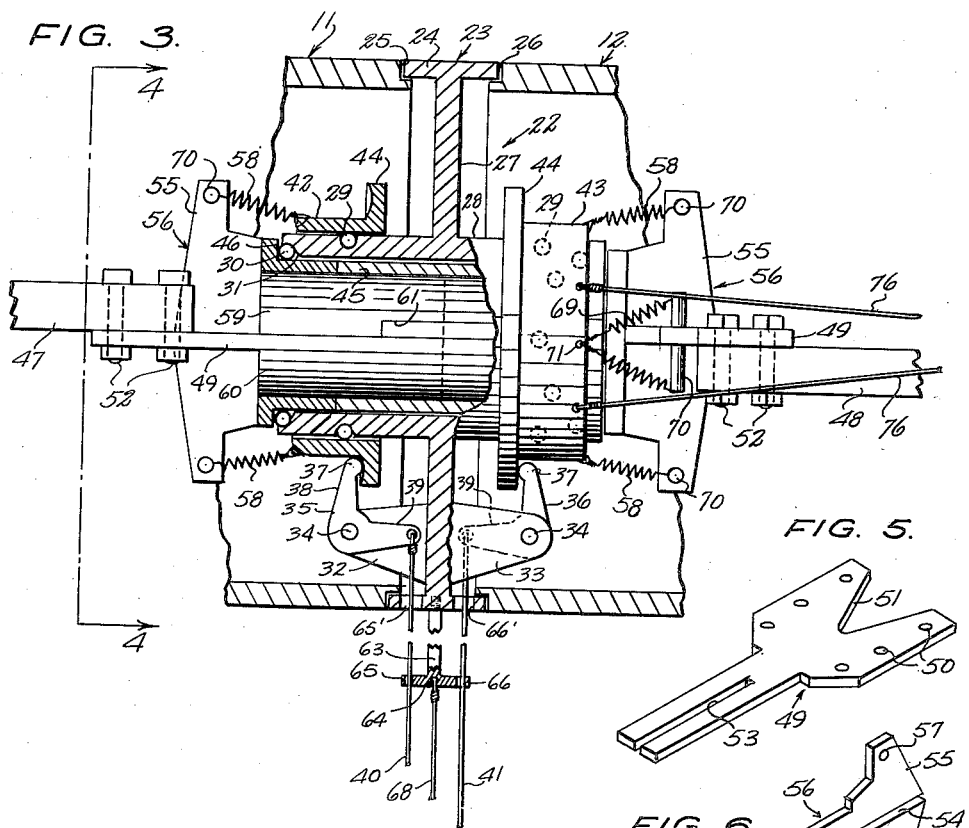
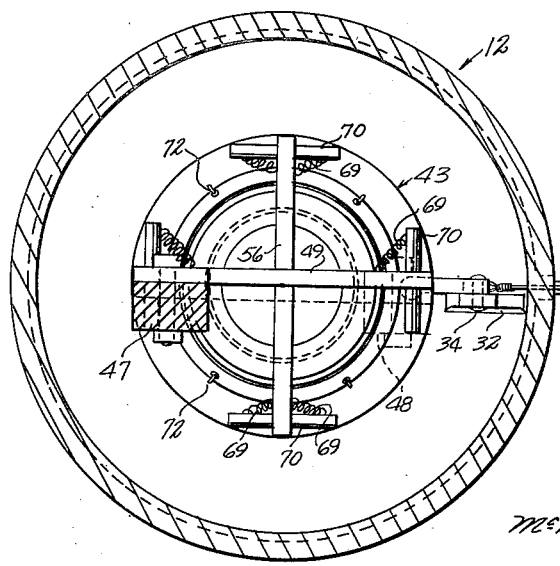
INVENTOR.
WARREN G. EPPLER,
BY
McMorrow, Berman & Davidson
ATTORNEYS.

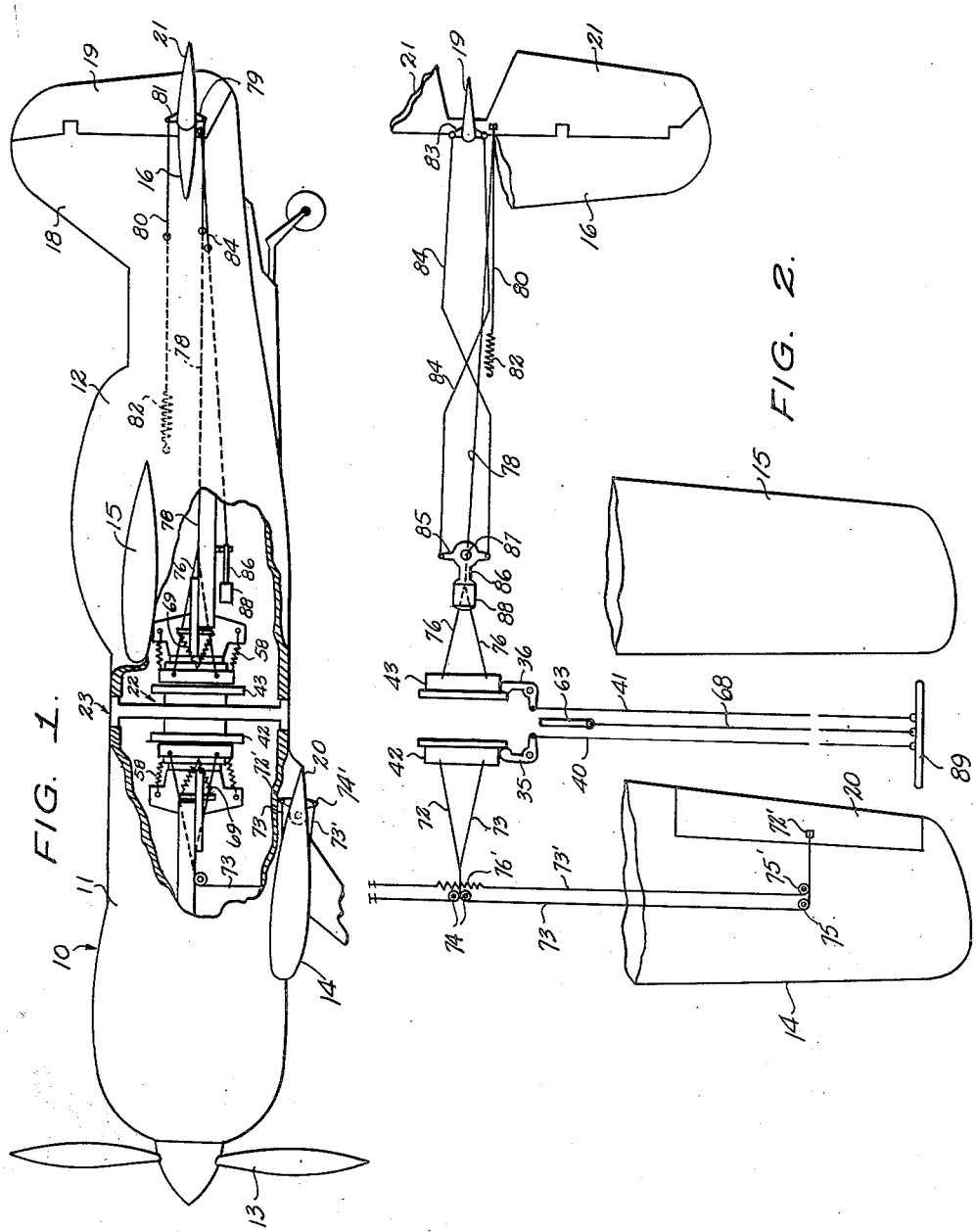

Patented May 6, 1952

2,595,650

UNITED STATES PATENT OFFICE 2,595,650

MODEL AIRPLANE FLIGHT CONTROL

Warren G. Eppler, Syracuse, N. Y.

Application March 10, 1950, Serial No. 149,008

6 Claims. (Cl. 46—77)

This invention relates to improvements in captive flight control means for miniature or model airplanes, the primary object of the invention being to provide for positive control of the pitch and of the roll of a flying model airplane as well as of the distance of the airplane from the operator, whereby closer approximation of the flight movements of a full size airplane is obtained.

Other important objects and advantageous features of the invention will be apparent from the following description and the accompanying drawings, wherein, for purposes of illustration only, a specific embodiment of the invention is set forth in detail.

In the drawings:

Figure 1 is a left-hand side elevation, partly broken away to show internal structure;

Figure 2 is a fragmentary schematic top plan view showing the connections to the left wing aileron and the left elevator;

Figure 3 is an enlarged, fragmentary, vertical, longitudinal section taken through the airplane fuselage and the control unit therein;

Figure 4 is a transverse vertical section taken on the line 4—4 of Figure 3;

Figures 5 through 8 are perspective views of control unit components.

Referring in detail to the drawings, wherein like numerals designate like parts throughout the several views, the numeral 10 generally designates the illustrated model airplane involving a front fuselage section 11 and a rear fuselage section 12, the front section having the tractor propeller 13 and the left and right-hand low wings 14. The rear section 12 has the high left and right-hand wings 15 and left and right-hand stabilizers 16, and the vertical rudder assembly 18, including the rudder 19. The forward low wings 14 include ailerons 20, and the stabilizers include elevators 21. The rearward high wings 15 do not have ailerons.

The control unit, generally designated at 22, acts as the sole structural connection between the cylindrical front fuselage section 11 and the cylindrical rear fuselage section 12, and is located at the center of lift of the airplane, approximately midway between the low and high wings. As shown in detail in Figures 3 and 4, the unit 22 comprises a circular frame 23 having an annular rim 24 positioned between the facing ends of the front and rear fuselage sections, the edges of the rim 24 running in grooves 25, 26 with its outer side flush with the outer surface of the fuselage sections. The frame 23 includes a web 27 connected to the middle of a hollow cylinder 28. Countersunk ball bearings 29 are distributed circumferentially on the outer side of each end of the cylinder 28 at intervals of 45°, 135°, 225° and 315°. Other ball bearings 30 are set in recesses 31 in the inner sides of the ends of the cylinder 28 between the ball bearings 29 at intervals of 90°, 180°, 270° and 360°.

The web 27 has front and rear lugs or brackets 32, 33, respectively, through which bolts or other suitable headed pivots 34 extend which extend also through the centers of front and rear bell crank levers 35, 36, respectively, having rounded cam noses 37 on their radial arms 38, with their other arms 39 projecting toward the web 27 and formed for connection of front and rear control lines 40, 41, respectively, thereto.

The cam noses 37 of the levers engage the outer surfaces of similar but reversed front and rear short sleeves 42, 43, respectively, which slide longitudinally on the front and rear ends of the cylinder 28, having annular, cupped flanges 44 on the ends thereof adjacent to the web 27, and against which the lever cam noses 37 are adapted to bear. The outer surface of the cylinder 28 is adapted to be lubricated to make the sleeves 42, 43, freely slidable thereon.

The cylinder 28 is rotatably mounted by the ball bearings 30 on a tubular axle 45 having end flanges 46 engaged by the ball bearings 30 to prevent longitudinal movement of the cylinder 28 on the axle 45. The axle 45 forms the rigid structural connection between the front and rear fuselage sections 11 and 12, respectively, which have axial structural members 47 and 48, respectively, connected rigidly thereto and projecting into spaced relation to the opposite ends of the axle 45, and are slightly offset to opposite sides of the longitudinal center of the axle, as shown in Figure 3.

In each end of the tubular axle 45 is secured, as by gluing, an assembly consisting of a Y-shaped, plywood plate 49, shown in Figure 5, formed with holes 50 in its bifurcated head 51, receiving bolts or other fastening means 52 secured to the related one of the structural members 47, 48. The plate 49 has a longitudinal slot 53 with which is interengaged the longitudinal slot 54 in the head 55 of a T-shaped, plywood plate 56, shown in Figure 6, the plates 49 and 56 then being glued together. The arms of the head 55 of the plate 56 have holes 57 receiving pins 70 for connection of helical springs 58. The springs 58 are stretched between the ends of the pins 70 on the arms of the head 55 and the adjacent ends of the related one of the sleeves 42, 43, whereby these sleeves are tensioned in directions away from the frame web 27. To take up the space in the tubular axle 45 at opposite sides of the portions of the plates 49 and 56, which are inserted in the opposite ends of the axle 45, there are provided quarter-cylindrical elements 59, 60, respectively, formed in flat sides thereof with cutouts 61, 62, respectively, leading from their inward ends, as shown in Figures 7 and 8. The elements 59, 60 are inserted from opposite ends in and glued in the axle 45 and to the plates 49, 56 with the cutouts 61, 62 interengaging the plates, as shown in Figure 3.

The frame 23 has a radial arm 63 projecting from the rim 24 having a crosshead 64 on its outer end formed on opposite sides with guide holes 65, 66 passing the front and rear control lines 40, 41, and the rim 24 is formed with similar guide holes 65', 66'. An intermediate or third control line 68 is connected to the middle of the crosshead 64.

Besides the springs 58 there are pairs of helical springs 69, 69 stretched between the outer ends of pins 70 extending through the plates 49 and points 71 on the outer ends of the related sleeves 42, 43, these points being midway between the points of connection of the springs 58. The springs 58 and 69 are connected to the sleeves 42, 43 at points between the points of connection of the control cables.

Pairs of left and right-hand aileron control cables 72, 73 leading forwardly in the front fuselage section and laterally outwardly in the left and right wings 14 around pulleys 74, and rearwardly therein around pulleys 75 to the ailerons 20, are connected at their rear ends to the forward end of the forward sleeve 42 at four equally spaced points which are equidistantly spaced from and between the related springs 58 and 69 in the manner shown in Figure 3, for the corresponding rear structure.

Left and right elevator control cables 76 and 77, respectively, are connected to four equally spaced points on the rear end of the rear sleeve 43, as described above, and lead rearwardly through the rear fuselage section 12 as a single cable 78 to connect with the lower horn 79 of the integrated elevators 21, as indicated in Figures 1 and 2. An upper elevator cable 80 is connected to the upper horn 81 of the elevators and leads forward to a stretched, retracting spring 82 connected to the rear fuselage section 12 and arranged to restore the elevators to level flight position from a depressed position.

The rudder 19 has oppositely projecting horns 83 to which are severally connected the rear ends of crossed control cables 84 which have their forward ends connected to opposite ends of a crosshead 85 on the rear end of a longitudinal lever 86 which is vertically pivoted at 87 on and beneath the rear fuselage section structural member 48, with a weight 88 on the forward end of the lever, arranged to swing by centrifugal force exerted by the flight of the airplane 10 in a circular course, the arrangement of the parts being such that the airplane is prevented from turning in toward the operator and is forced to maintain a constant slight angle toward the outer side of the circular flight course. This arrangement operates to eliminate slack in the intermediate or third control line 68. The control line 68 is connected at a point between the points of connection of the control lines 40, 41 to a stick 89 which is designed to be held by the operator in a diametrical position with respect to the circular flight course.

The aileron control cables 72, 73 are connected to the upper horns 72' of the ailerons 20. An equalizing cable 73' is connected at its ends to the lower horns 74' of the ailerons and runs around pulleys 75' near the locations of the pulleys 75 and has a contractile helical spring 76' intermediate its ends, the effect of which is to restore the ailerons in equal degrees toward level flight positions from rolling or banking positions.

The control unit 22 being freely rotatable relative to the fuselage of the airplane 10, as described above, it is obvious that the airplane can roll on its longitudinal axis without tangling the control lines 40, 41, and 68 and with substantially complete control by the operator as to the start and end of a rolling maneuver.

With the airplane 10 in flight, pulling on the rear control line 41 swings the rear bell cranks 36 forwardly, whereby the rear sleeve 43 is pushed forwardly and the cables 76, 77 terminating in the single cable 78, connected to the lower elevator horn 79, are pulled forwardly, thereby tilting the elevators 21 downwardly against the resistance of the spring 82 of the cable 80 connected to the upper horn 81 of the elevators. When this pull is relaxed, the spring 82 returns the elevators toward level flight position, but some control line pull must be maintained by the operator to prevent the spring 82 from moving the elevators upwardly past level flight position when not desired.

By regulating the control stick 89 so as to pull upon the front control line 40, the front bell crank 35 is turned so that the front sleeve 42 is pushed rearwardly. This exerts pull upon the aileron control cables 73, 72 which, being connected to the upper and lower horns, respectively, of the left and right-hand wing ailerons, swing the left-hand aileron upwardly and the right-hand wing aileron downwardly, thereby causing the airplane to roll wing-over-wing on its longitudinal axis or center of thrust. In this action the control unit 22 remains relatively stationary in a position determined by the pull of the third control line 68, while the airplane fuselage turns relative to the control unit. The centrifugal force of the circling airplane holds the control lines 40, 68 and 41 taut. When the control stick 89 is returned by the operator to normal position from angulated control positions, the springs 58 and 69 return the sleeves 42, 43 toward the frame web 27 and condition return of the ailerons 20 and the elevators 21 toward their initial positions by the springs 76' and 82, respectively, thereby putting an end to the rolling action. In returning the ailerons to initial position, enough pull must be maintained by the operator on the control line 40 to prevent the springs from retracting the ailerons beyond their initial positions, otherwise rolling action in the opposite direction would ensue.

Should the airplane go into upside-down flight, the weight 88 on the lever 86 will, due to centrifugal force, swing the lever to the opposite side of its normal position, thereby turning the rudder 19 toward the opposite side, whereby the line of thrust of the airplane is maintained toward the outside of the flight circle.

I claim:

1. In a miniature airplane, a fuselage comprising a front section having lateral wings thereon having ailerons, a rear section having a vertical rudder and elevators thereon, said front and rear sections being substantially cylindrical with the rear end of the front section spaced from the front end of the rear section, an axle extending axially in and rigidly connected to said front and rear sections and extending across the space between the sections, a tubular cylinder rotatably mounted on said axle, a web fixed on and radiating from the middle of said cylinder, an annular rim on the outer edge of said web bridging the space between and running freely between the facing ends of said front and rear sections, a radial arm projecting from said rim beyond the sides of the sections, said arm being formed with control line guide means, front and rear sleeves slidably and rotatably mounted on said cylinder at opposite sides of said web, retracting spring means connected between said sleeves and front and rear portions on said axle whereby said sleeves are tensioned in directions away from said web, aileron control cables connected between said front sleeve and said wing ailerons, elevator control cables connected between said rear sleeve and said elevators, front and rear cam levers pivoted on portions of said web and operatively engaging said front and rear sleeves, respectively, front and rear control lines engaging said guide means and connected to said front and rear cam levers whereby pulling said front and rear control lines operates said cam levers to move said front and rear sleeves, respectively, toward said web so as to depress the ailerons and elevators out of initial flight positions against the resistance of said retracting spring means in directions to produce roll of the airplane on its axis in one direction, and whereby partial relaxation of said control lines permits said spring means to retract said sleeves away from said frame web so as to return said ailerons and elevators toward their initial flight positions and further relaxation thereof permits said spring means to move said ailerons and elevators beyond their initial flight positions so as to produce rolling of the airplane in the opposite direction, and a third control line connected to said radial arm and engaging said control line guide means for confining the airplane to a circular course of flight.

2. In a miniature airplane, a fuselage comprising a front section having lateral wings thereon having ailerons, a rear section having a vertical rudder and elevators thereon, said front and rear sections being substantially cylindrical with the rear end of the front section spaced from the front end of the rear section, an axle extending axially in and rigidly connected to said front and rear sections and extending across the space between the sections, a tubular cylinder rotatably mounted on said axle, a web fixed on and radiating from the middle of said cylinder, an annular rim on the outer edge of said web bridging the space between and running freely between the facing ends of said front and rear sections, a radial arm projecting from said rim beyond the sides of the sections, said arm being formed with control line guide means, front and rear sleeves slidably and rotatably mounted on said cylinder at opposite sides of said web, retracting spring means connected between said sleeves and front and rear portions on said axle whereby said sleeves are tensioned in directions away from said web, aileron control cables connected between said front sleeve and said wing ailerons, elevator control cables connected between said rear sleeve and said elevators, front and rear cam levers pivoted on portions of said web and operatively engaging said front and rear sleeves, respectively, front and rear control lines engaging said guide means and connected to said front and rear cam levers whereby pulling said front and rear control lines operates said cam levers to move said front and rear sleeves, respectively, toward said web so as to depress the ailerons and elevators out of initial flight positions against the resistance of said retracting spring means in directions to produce roll of the airplane on its axis in one direction, and whereby partial relaxation of said control lines permits said spring means to retract said sleeves away from said frame web so as to return said ailerons and elevators toward their initial flight positions and further relaxation thereof permits said spring means to move said ailerons and elevators beyond their initial flight positions so as to produce rolling of the airplane in the opposite direction, and a third control line connected to said radial arm and engaging said control line guide means for confining the airplane to a circular course of flight, an operator's control stick to which said third control line is connected with said front and rear control lines connected to said stick at opposite sides of said third control line whereby said control lines can be maintained taut while said control stick is angulated toward either end thereof to exert pull on the front control line while relaxing the rear control line or to exert pull on the rear control line while relaxing the front control line.

3. In a miniature airplane, a fuselage comprising a front section having lateral wings thereon having ailerons, a rear section having a vertical rudder and elevators thereon, said front and rear sections being substantially cylindrical with the rear end of the front section spaced from the front end of the rear section, an axle extending axially in and rigidly connected to said front and rear sections and extending across the space between the sections, a tubular cylinder rotatably mounted on said axle, a web fixed on and radiating from the middle of said cylinder, an annular rim on the outer edge of said web bridging the space between and running freely between the facing ends of said front and rear sections, a radial arm projecting from said rim beyond the sides of the sections, said arm being formed with control line guide means, front and rear sleeves slidably and rotatably mounted on said cylinder at opposite sides of said web, retracting spring means connected between said sleeves and front and rear portions on said axle whereby said sleeves are tensioned in directions away from said web, aileron control cables connected between said front sleeve and said wing ailerons, elevator control cables connected between said rear sleeve and said elevators, front and rear cam levers pivoted on portions of said web and operatively engaging said front and rear sleeves, respectively, front and rear control lines engaging said guide means and connected to said front and rear cam levers whereby pulling said front and rear control lines operates said cam levers to move said front and rear sleeves, respectively, toward said web so as to depress the ailerons and elevators out of initial flight positions against the resistance of said retracting spring means in directions to produce roll of the airplane on its axis in one direction, and whereby partial relaxation of said control lines permits said spring means to retract said sleeves away from said web so as to return said ailerons and elevators toward their initial flight positions and further relaxation thereof permits said spring means to move said ailerons and elevators beyond their initial flight positions so as to produce rolling of the airplane in the opposite direction, and a third control line connected to said radial arm and engaging said control line guide means for confining the airplane to a circular course of flight, a rudder control lever pivoted on a vertical axis on said rear fuselage section having a weight thereon, crossed control cables connected between opposite sides of said rudder control lever and opposite sides of said rudder whereby the centrifugal force exerted upon said weight with the airplane in circular flight swings said lever in a direction to angle the rudder sufficiently to hold said airplane at an angle outside of its circular flight course.

4. An airplane comprising axially spaced front and rear fuselage sections, the front and rear sections having wings, ailerons on the front section wings, and the rear section having a vertical rudder and an elevator, a control unit comprising an axle arranged axially in and secured to said sections and extending across the space between the sections, said axle constituting the sole structural connection between the sections, control mechanism rotatably mounted on said axle, control lines leading from said mechanism from between said front and rear sections, said mechanism comprising operating components connected to said ailerons and said elevator and to some of said control lines, one of said control lines being anchored to a relatively stationary portion of said mechanism whereby the airplane is confined to a circular flight course.

5. In a miniature airplane, a fuselage comprising a front section having lateral wings thereon having ailerons, a rear section having a vertical rudder and elevators thereon, said front and rear sections being substantially cylindrical with the rear end of the front section spaced from the front end of the rear section, an axle extending axially in and rigidly connected to said front and rear sections and extending across the space between the sections, a tubular cylinder rotatably mounted on said axle, a web fixed on and radiating from the middle of said cylinder, an annular rim on the outer edge of said web bridging the space between and running freely between the facing ends of said front and rear sections, a radial arm projecting from said rim beyond the sides of the sections, said arm being formed with control line guide means, front and rear sleeves slidably and rotatably mounted on said cylinder at opposite sides of said web, retracting spring means connected between said sleeves and front and rear portions on said axle whereby said sleeves are tensioned in directions away from said web, aileron control cables connected between said front sleeve and said wing ailerons, elevator control cables connected between said rear sleeve and said elevators, front and rear cam levers pivoted on portions of said web and operatively engaging said front and rear sleeves, respectively, front and rear control lines engaging said guide means and connected to said front and rear cam levers whereby pulling said front and rear control lines operates said cam levers to move said front and rear sleeves, respectively, toward said web so as to depress the ailerons and elevators out of initial flight positions against the resistance of said retracting spring means in directions to produce roll of the airplane on its axis in one direction, and whereby partial relaxation of said control lines permits said spring means to retract said sleeves away from said frame web so as to return said ailerons and elevators toward their initial flight positions and further relaxation thereof permits said spring means to move said ailerons and elevators beyond their initial flight positions so as to produce rolling of the airplane in the opposite direction, and a third control line connected to said radial arm and engaging said control line guide means for confining the airplane to a circular course of flight, and return means for returning said ailerons and elevators toward level flight positions thereof from depressed positions thereof, said return means being supplemental to said retracting spring means and connected directly to the ailerons and elevators.

6. In a miniature airplane, a fuselage comprising a front section having lateral wings thereon having ailerons, a rear section having a vertical rudder and elevators thereon, said front and rear sections being substantially cylindrical with the rear end of the front section spaced from the front end of the rear section, an axle extending axially in and rigidly connected to said front and rear sections and extending across the space between the sections, a tubular cylinder rotatably mounted on said axle, a web fixed on and radiating from the middle of said cylinder, an annular rim on the outer edge of said web bridging the space between and running freely between the facing ends of said front and rear sections, a radial arm projecting from said rim beyond the sides of the sections, said arm being formed with control line guide means, front and rear sleeves slidably and rotatably mounted on said cylinder at opposite sides of said web, retracting spring means connected between said sleeves and front and rear portions on said axle whereby said sleeves are tensioned in directions away from said web, aileron control cables connected between said front sleeve and said wing ailerons, elevator control cables connected between said rear sleeve and said elevators, front and rear cam levers pivoted on portions of said web and operatively engaging said front and rear sleeves, respectively, front and rear control lines engaging said guide means and connected to said front and rear cam levers whereby pulling said front and rear control lines operates said cam levers to move said front and rear sleeves, respectively, toward said web so as to depress the ailerons and elevators out of initial flight positions against the resistance of said retracting spring means in directions to produce roll of the airplane on its axis in one direction, and whereby partial relaxation of said control lines permits said spring means to retract said sleeves away from said frame web so as to return said ailerons and elevators toward their initial flight positions and further relaxation thereof permits said spring means to move said ailerons and elevators beyond their initial flight positions so as to produce rolling of the airplane in the opposite direction, a third control line connected to said radial arm and engaging said control line guide means for confining the airplane to a circular course of flight, return means for returning said ailerons and elevators toward level flight positions thereof from depressed positions thereof, said return means being supplemental to said retracting spring means and connectly directly to the ailerons and elevators, said return means comprising first spring means stretched between the ailerons, and second spring means stretched between a portion of the fuselage and said elevators.

WARREN G. EPPLER.

REFERENCES CITED

The following references are of record in the file of this patent:

UNITED STATES PATENTS

| Number | Name | Date |
|---|---|---|
| 1,400,097 | Perkins | Dec. 13, 1921 |
| 1,852,340 | Vlahov | Apr. 5, 1932 |
| 1,895,871 | Vlahov | Jan. 31, 1933 |
| 2,061,953 | Sampson | Nov. 24, 1936 |
| 2,404,922 | Padgett | July 30, 1946 |
| 2,454,598 | Doyle | Nov. 23, 1948 |
| 2,538,132 | Taggert | Jan. 16, 1951 |